Dec. 22, 1931.  W. H. RAYMOND  1,837,673
HANDLE AND COVER
Filed April 23, 1930
Fig. 1.
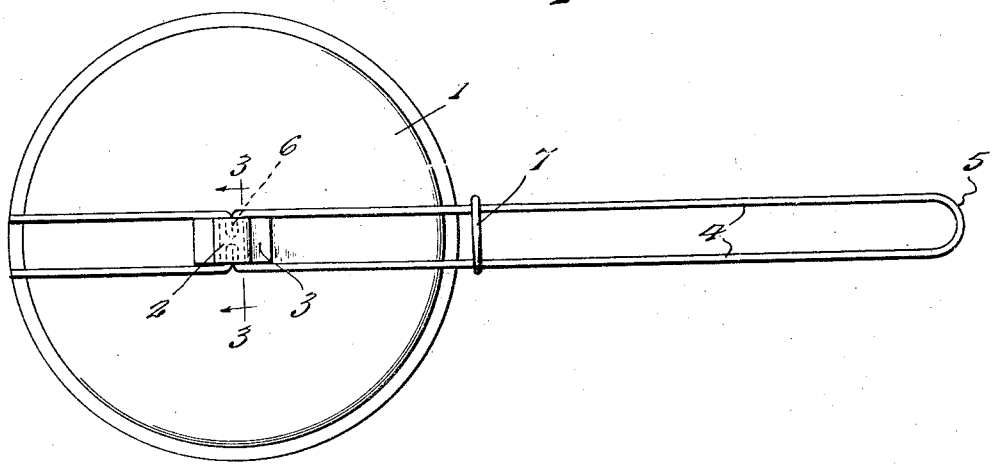
Fig. 2.
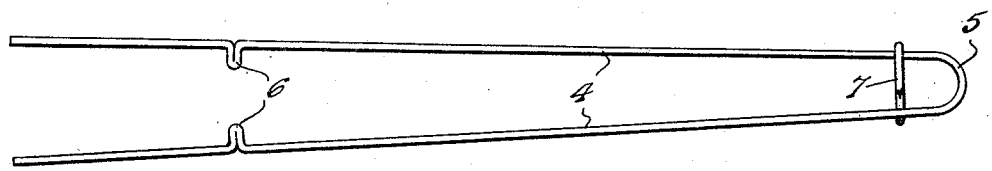
Fig. 3.  Fig. 4.
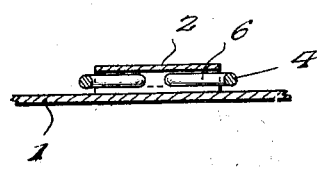 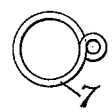
Inventor
W. H. Raymond.
By Lacey & Lacey, Attorneys Patented Dec. 22, 1931

1,837,673

UNITED STATES PATENT OFFICE

WENDELL H. RAYMOND, OF BUFFALO, NEW YORK

HANDLE AND COVER

Application filed April 23, 1930. Serial No. 446,648.

This invention relates to an improved handle and cover and is preferably intended for use in conjunction with culinary utensils.

One object of the invention is to provide a device of this character which will greatly lessen the danger of the housewife becoming burned while handling the cover of a kitchen utensil.

Another object of the invention is to provide an improved handle and cover which may be conveniently suspended from a hook when not in use.

A further object of the invention is to provide an improved handle and cover wherein the handle may be readily detached from the cover when desired.

And still another object of the invention is to provide a device of this character wherein the cover may be readily lifted without danger of overbalancing and displacing said cover from the handle.

Other and incidental objects of the invention not specifically mentioned in the foregoing will appear during the course of the following description.

In the drawings:

Figure 1 is a top plan view of the device showing the handle in engagement with the cover.

Figure 2 is a plan view of the handle with the legs expanded and showing the contracting ring retracted.

Figure 3 is an enlarged fragmentary sectional view on the line 3—3 of Figure 1, looking in the direction indicated by the arrows.

Figure 4 is a side elevation showing the locking ring employed.

Referring now to the drawings, my improved device comprises a preferably circular lid 1 which may be flat or of the usual concavo convex cross sectional form. Fixed to the outer surface of the lid axially thereof is a preferably sheet metal substantially U-shaped loop having a straight bight portion 2 and provided at its ends with lateral ears 3 which are soldered or otherwise secured to the lid. The loop is of uniform width throughout its length so that the side edges thereof are straight and parallel and, if desired, said loop may be struck up from the lid 1.

The improved handle comprising a part of the present invention is preferably formed from a length of suitable resilient wire which is bent into substantially U-shape to provide spaced arms 4 connected by a bight 5, the arms being straight from end to end. As seen more clearly in Figure 2 of the drawings, the arms 4 normally diverge toward their free ends and, at points spaced from the ends of the arms, the wire is looped to define a pair of oppositely disposed lugs 6 projecting inwardly from the arms, the sides of the loops abutting. The lugs 6 are disposed in the same plane with the arms. Surrounding the arms 4 is a locking ring 7 which is provided with a loop surrounding one of the legs so that displacement of the ring from the legs will be prevented.

As will now be observed, the arms 4 normally stand apart such distance that said arms may be readily disposed to straddle the loop 2 of the cover so that the lugs 6 will be presented at opposite sides of the loop when, by sliding the ring 7 forwardly, the arms will be swung toward each other to engage said lugs within the loop and more or less tightly bind the arms in contact with the straight side edges of the loop. In this connection, it should be noted that the loop and handle are so proportioned that when the handle is engaged with the loop, the arms 4 will, as shown in Figure 1, be substantially parallel.

As the loop is gripped between the arms, rotation of the lid on the handle will be prevented. Furthermore, attention is directed to the fact that, when the handle is engaged with the lid, the free end portions of the arms will abut the upper surface of the lid and, as the lugs are in engagement under the bight portion of the loop, the lid will be prevented from teetering or wobbling. The handle, either separately or in conjunction with the lid, may be suspended by engaging the bight portion 3 over a nail or other convenient hook. Attention is further directed to the fact that the handle and lid may be held beneath a cooking utensil when carrying said utensil from place to place, thus catching any dripping grease and thereby tending to maintain the kitchen floor free from grease spots.

What is claimed is:

1. A device of the class described including a lid having a loop, and a handle having arms provided at points between the ends thereof with lugs engaging the loop for removably connecting said handle with the lid.

2. A device of the class described including a lid having a loop, and a handle having spaced arms provided near their free ends with lugs engaging the loop for connecting said handle with the lid, portions of the arms confronting the lid at the opposite sides of said loop for limiting the lid against teetering.

3. A device of the character described including a lid, a loop fixed thereto and provided with straight parallel side edges, and a handle having straight spaced arms normally straddling the loop and provided with lugs engaging said loop for connecting the handle with the lid, said arms engaging said edges for binding the loop between said arms whereby rotation of the lid will be prevented.

4. The combination with a lid having a loop, of a handle having spaced arms extending transversely of the lid in close proximity thereto and provided at points spaced from their ends with lugs engaging beneath said loop at opposite sides thereof for connecting the handle with the lid, and means acting on the arms for locking the lugs in engagement with the loop.

In testimony whereof I affix my signature.

WENDELL H. RAYMOND.